US012738553B2

(12) United States Patent
Roh

(10) Patent No.: US 12,738,553 B2
(45) Date of Patent: Sep. 15, 2026

(54) BATTERY CELL STACK, METHOD OF MANUFACTURING THE SAME, AND ALIGNMENT MARK FORMING APPARATUS FOR FORMING ALIGNMENT MARK AT THE BATTERY CELL STACK

(71) Applicant: LG Energy Solution, Ltd., Seoul (KR)

(72) Inventor: Tae Hwan Roh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 478 days.

(21) Appl. No.: 18/565,938

(22) PCT Filed: May 24, 2023

(86) PCT No.: PCT/KR2023/007081
§ 371 (c)(1),
(2) Date: Nov. 30, 2023

(87) PCT Pub. No.: WO2023/229372
PCT Pub. Date: Nov. 30, 2023

(65) Prior Publication Data

US 2024/0266626 A1 Aug. 8, 2024

(30) Foreign Application Priority Data

May 24, 2022 (KR) ........................ 10-2022-0063601
May 23, 2023 (KR) ........................ 10-2023-0066513

(51) Int. Cl.
*H01M 10/48* (2006.01)
*B21D 37/10* (2006.01)
(Continued)

(52) U.S. Cl.
CPC .......... *H01M 10/488* (2013.01); *B21D 37/10* (2013.01); *H01M 50/211* (2021.01); *H01M 50/289* (2021.01)

(58) Field of Classification Search
None
See application file for complete search history.

(56) References Cited

U.S. PATENT DOCUMENTS

2014/0272529 A1* 9/2014 Devan ................. H01M 50/434 156/581
2019/0393559 A1* 12/2019 Eskra ................... H01M 4/661
(Continued)

FOREIGN PATENT DOCUMENTS

CN 213878216 U 8/2021
JP 2008140757 A 6/2008
(Continued)

OTHER PUBLICATIONS

KR-20210038334-A English machine translation (Year: 2021).*
(Continued)

*Primary Examiner* — Scott J. Chmielecki
(74) *Attorney, Agent, or Firm* — Lerner David LLP

(57) ABSTRACT

The present invention relates to a battery cell stack in which a plurality of pouch-shaped battery cells is stacked. An alignment mark is formed at the bottom of a receiving portion configured to receive an electrode assembly in each of the plurality of pouch-shaped battery cells. The plurality of pouch-shaped battery cells is stacked such that the alignment marks individually formed at the pouch-shaped battery cells completely overlap each other in a stacking direction, and the alignment mark is a reference for measuring the dimensions of the pouch-shaped battery cells. Consequently, it is possible to manufacture a battery cell stack in which the plurality of pouch-shaped battery cells is accurately aligned with each other in the stacking direction.

11 Claims, 5 Drawing Sheets

(51) Int. Cl.
*H01M 50/211* (2021.01)
*H01M 50/289* (2021.01)

(56) References Cited

U.S. PATENT DOCUMENTS

| | | | | |
|---|---|---|---|---|
| 2020/0271437 | A1* | 8/2020 | Kim | H01M 10/0436 |
| 2021/0013481 | A1* | 1/2021 | Kuwata | H01M 50/244 |

FOREIGN PATENT DOCUMENTS

| | | | | | |
|---|---|---|---|---|---|
| JP | 2009283342 | A | | 12/2009 | |
| JP | 2014179271 | A | | 9/2014 | |
| JP | 6929443 | B2 | | 9/2021 | |
| KR | 20060011245 | A | | 2/2006 | |
| KR | 100601537 | B1 | | 7/2006 | |
| KR | 20170091938 | A | | 8/2017 | |
| KR | 101837234 | B1 | | 3/2018 | |
| KR | 20180054326 | A | | 5/2018 | |
| KR | 20190051831 | A | | 5/2019 | |
| KR | 20190086942 | A | | 7/2019 | |
| KR | 20210038334 | A | * | 4/2021 | H01M 50/105 |
| KR | 20210049471 | A | | 5/2021 | |
| KR | 102336355 | B1 | | 12/2021 | |
| KR | 102398300 | B1 | | 5/2022 | |
| WO | 2019187042 | A1 | | 10/2019 | |

OTHER PUBLICATIONS

Extended European Search Report for Application No. 23812146.1 dated Sep. 17, 2024, pp. 1-5.

International Search Report for Application No. PCT/KR2023/007081 mailed Aug. 28, 23, 3 pages. [See p. 2, categorizing the cited references].

* cited by examiner

【FIG. 1】
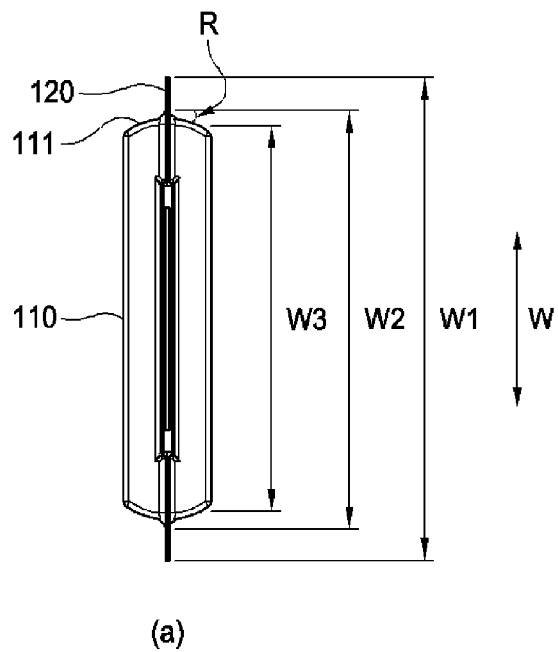
(a)
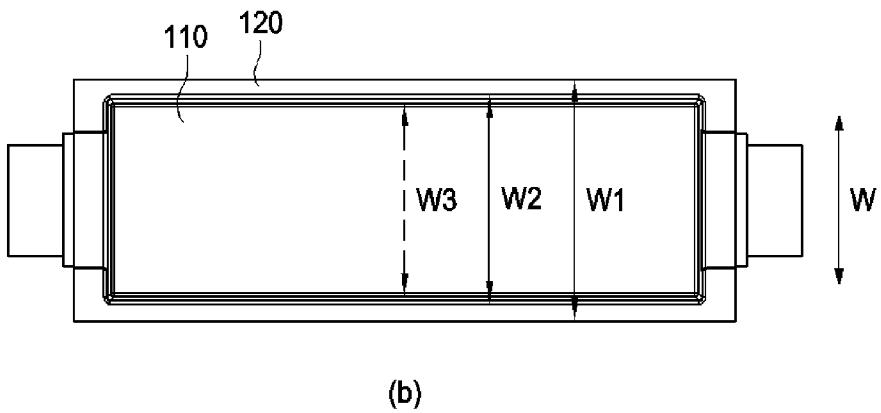
(b)
PRIOR Art

【FIG. 2】
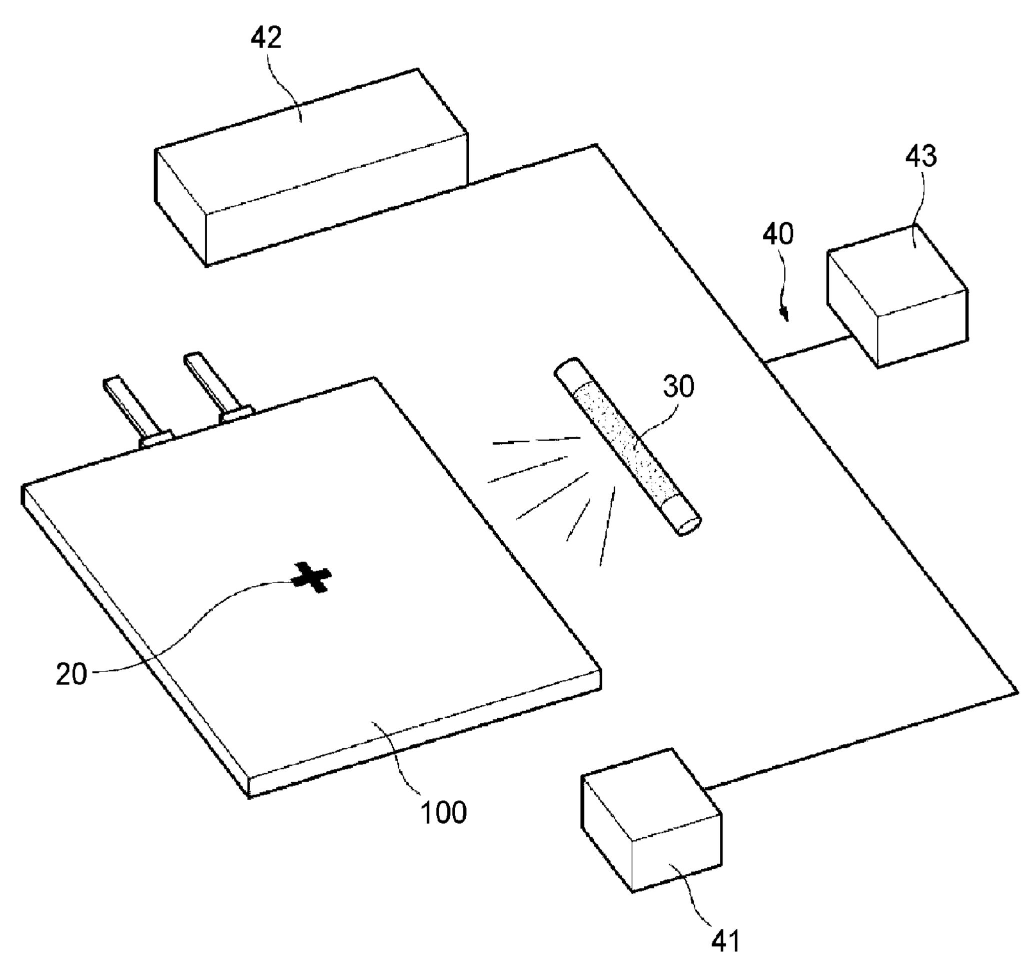
PRIOR ART

【FIG. 3】
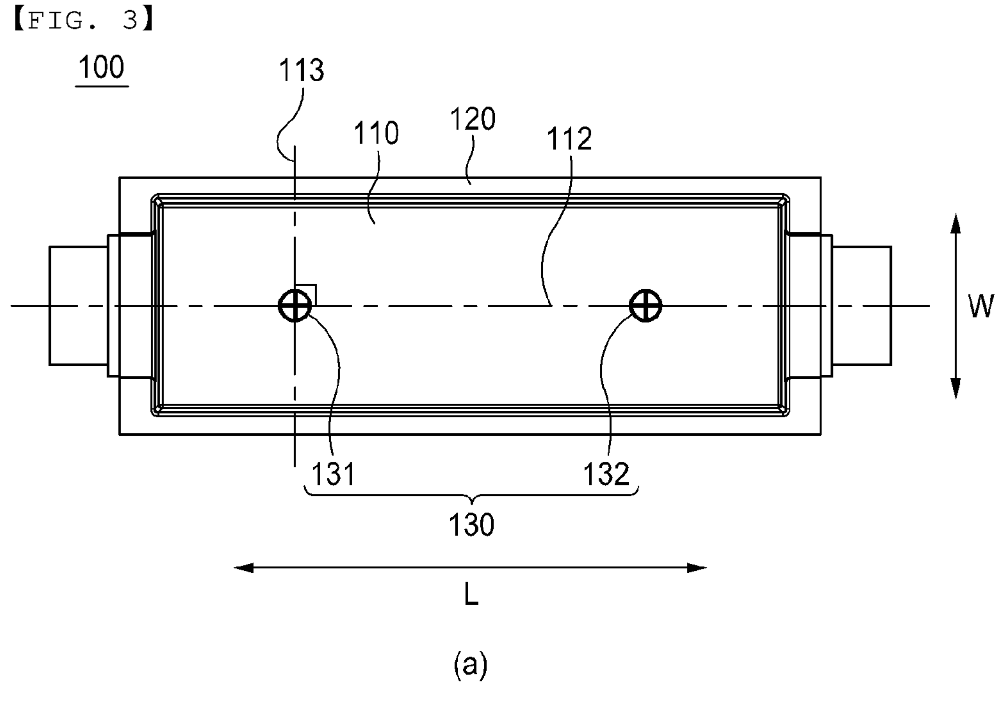
(a)
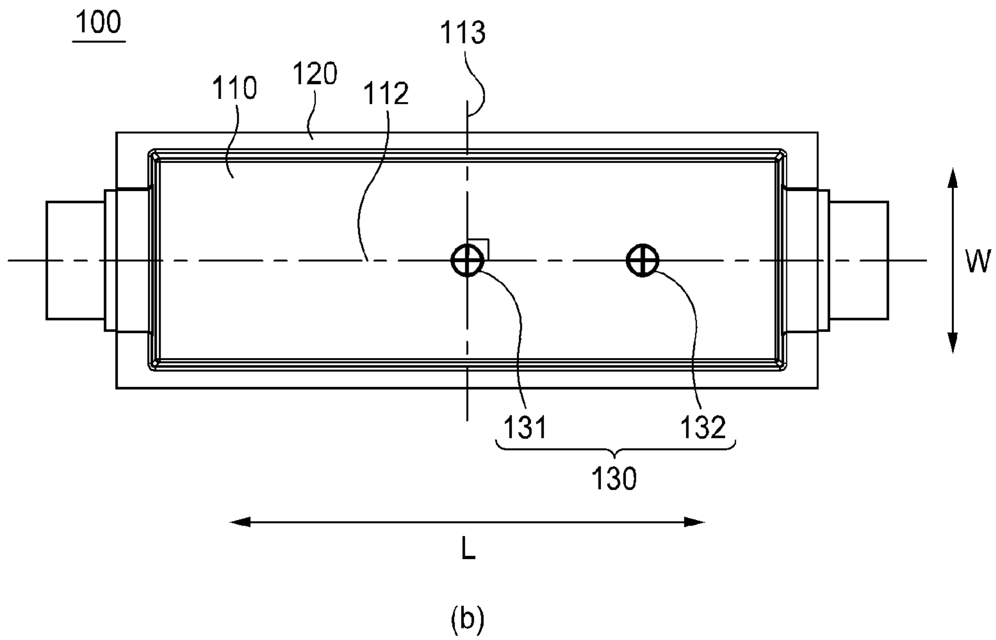
(b)

【FIG. 4】
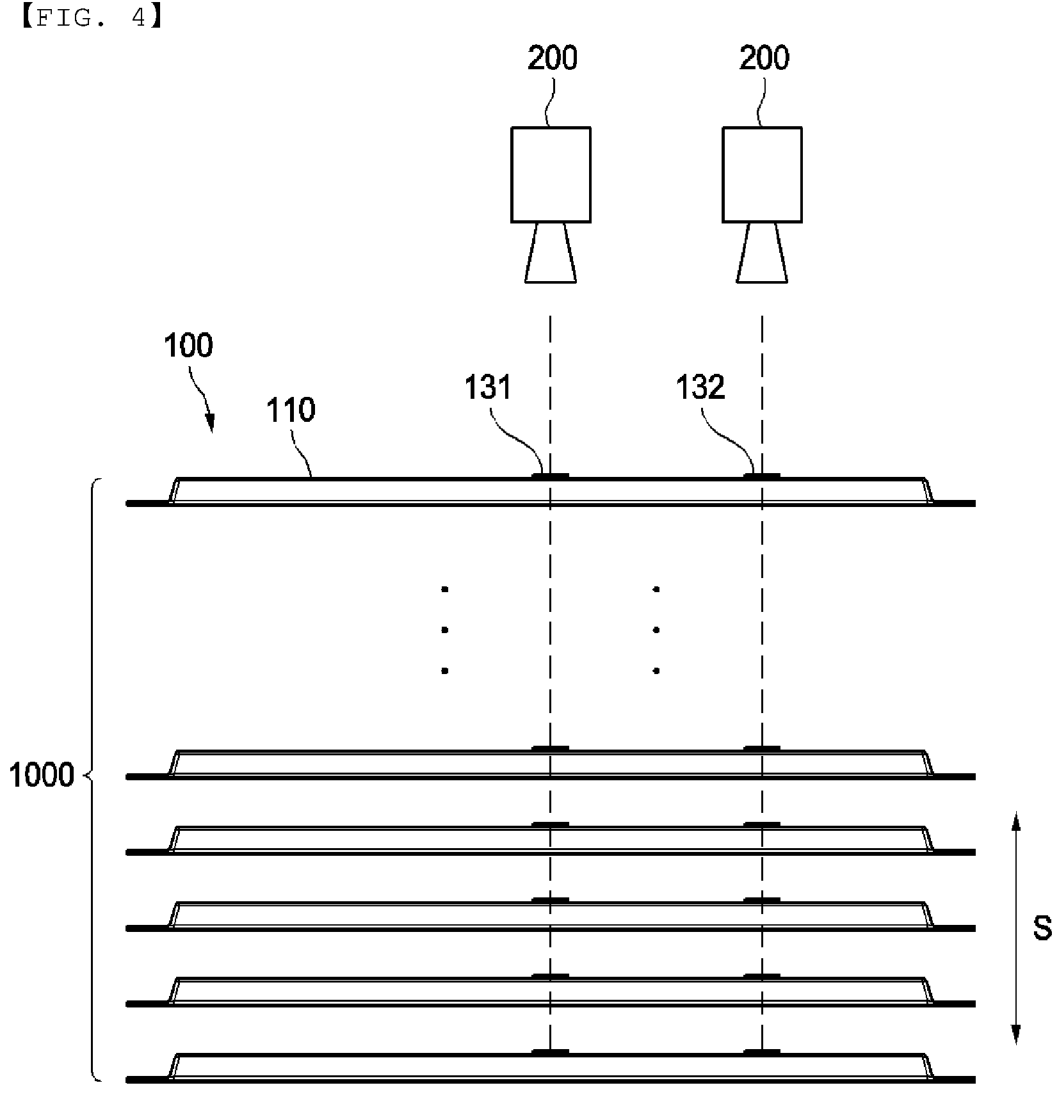

【FIG. 5】
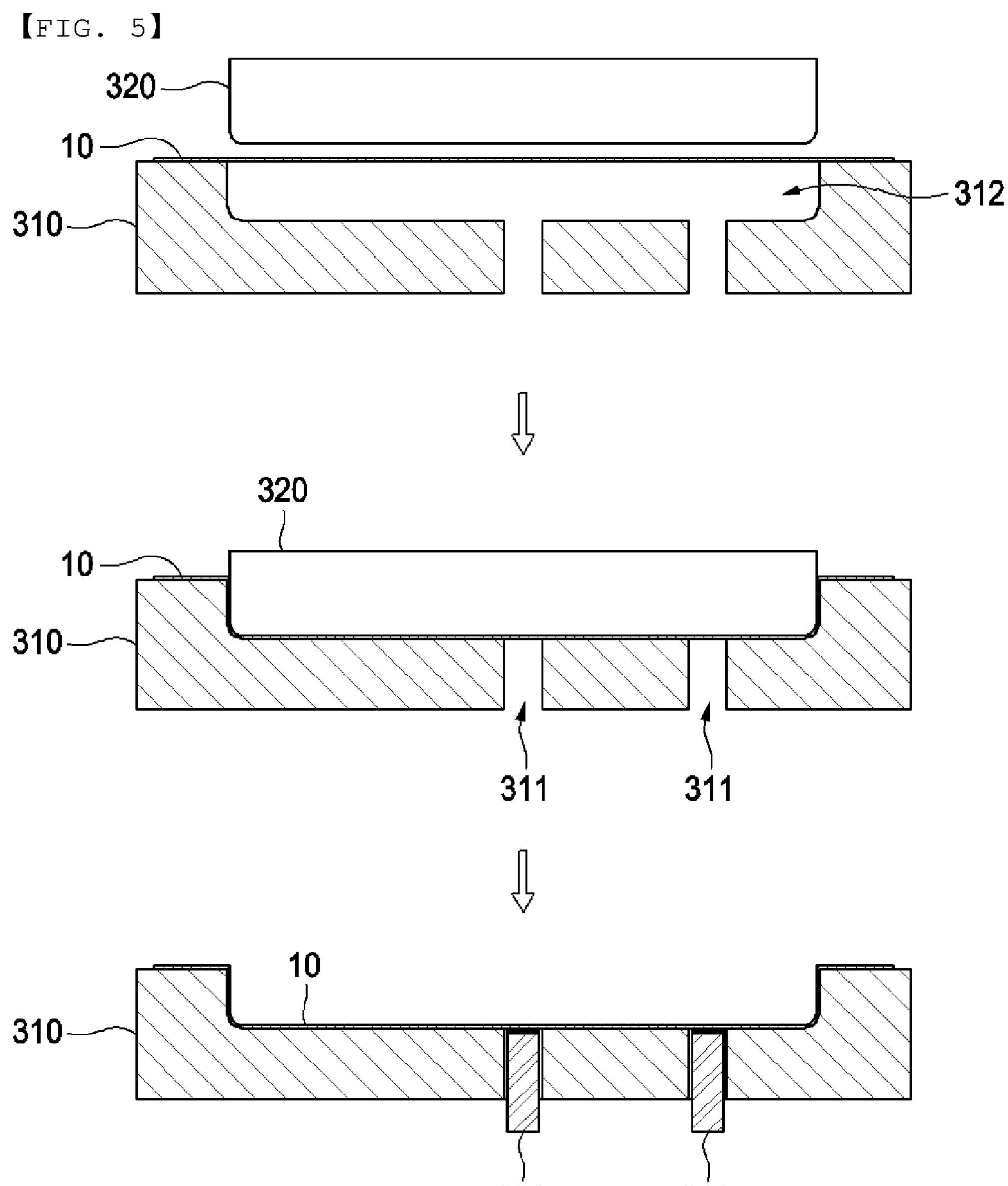

BATTERY CELL STACK, METHOD OF MANUFACTURING THE SAME, AND ALIGNMENT MARK FORMING APPARATUS FOR FORMING ALIGNMENT MARK AT THE BATTERY CELL STACK

CROSS-REFERENCE TO RELATED APPLICATIONS

This application is a national phase entry under 35 U.S.C. § 371 of International Application No. PCT/KR2023/007081 filed May 24, 2023, which claims the benefit of priority to Korean Patent Application No. 10-2022-0063601 filed on May 24, 2022, and Korean Patent Application No. 10-2023-0066513 filed on May 23, 2023, the disclosures of which are incorporated herein by reference in their entireties.

TECHNICAL FIELD

The present invention relates to a battery cell stack, a method of manufacturing the same, and an alignment mark forming apparatus for forming an alignment mark at the battery cell stack. More particularly, the present invention cell relates to a battery stack including pouch-shaped battery cells with alignment marks, by which the pouch-shaped battery cells are easily and accurately aligned with each other, a method of manufacturing the same, and an alignment mark forming apparatus for forming the alignment marks at the battery cell stack.

BACKGROUND ART

Lithium secondary batteries, which are rechargeable and have high energy density, have attracted attention as a new energy source with environmentally-friendly characteristics not only because the lithium secondary batteries can drastically reduce the use of fossil fuels but also because the lithium secondary batteries do not generate by-products from the use of energy.

Lithium secondary batteries may be classified based on the shape thereof. Specifically, lithium secondary batteries may be classified into a cylindrical battery cell manufactured by inserting an electrode assembly into a metal can, a prismatic battery cell manufactured by inserting an electrode assembly into a metal can, and a pouch-shaped battery cell manufactured by inserting an electrode assembly into a battery case made of a laminate sheet including a resin layer and a metal layer.

Thereamong, the pouch-shaped battery cell has advantages of easy deformation and high energy density.

FIG. 1 is a front view and a plan view of a general pouch-shaped battery cell.

Referring to FIG. 1, the pouch-shaped battery cell generally includes a receiving portion 110, which is centrally located and has an electrode assembly received therein, and a sealed portion 120, which is located at a periphery of the receiving portion 110 and is a sealed region of the pouch-shaped battery cell, when a rectangular, large-area outer surface of the pouch-shaped battery cell is viewed.

Generally, in order to manufacture a battery case of a pouch-shaped battery cell, a laminate sheet may be placed on a die having a recess for a receiving portion, and the laminate sheet may be pressed using a punch to produce a battery case having a receiving portion and a sealed portion.

For the battery case manufactured as described above, a gradient angle R for removal of the battery case from the die after forming the battery case is necessarily provided at a side surface 111 of the receiving portion. In addition, corners of the receiving portion 110 are rounded in order to prevent tearing of the laminate sheet during formation of the battery case. As a result, the side surface 111 of the receiving portion is inclined with respect to the bottom of the receiving portion, and the corners of the receiving portion are curved, and therefore it is difficult to set a reference for measuring the exact size of the pouch-shaped battery cell in a direction in which a rectangular, large-area outer surface of the pouch-shaped battery cell is viewed.

In FIG. 1, W1 indicates the maximum value of an overall width W of the pouch-shaped battery cell, W2 indicates the maximum value of the receiving portion 110 at the overall width W of the pouch-shaped battery cell, and W3 indicates the minimum value of the receiving portion 110 at the overall width W of the pouch-shaped battery cell.

Since rigidity of the sealed portion 120 of the pouch-shaped battery cell is not high, the sealed portion may be easily subject to deformation, such as bending, during a battery cell manufacturing process or during dimensional measurement thereof. When dimensional measurement or positioning for alignment is performed based on the shape of the sealed portion 120, therefore, great errors frequently occur, whereby it is not easy to precisely control tolerance.

In addition, when considering the fact that the side surface 111 of the receiving portion is curved or inclined, it is not easy to set a reference for each of W2 and W3.

Therefore, when a plurality of pouch-shaped battery cells is stacked based on the outer perimeter of each pouch-shaped battery cell in order to manufacture a battery module or a battery pack in which the plurality of pouch-shaped battery cells is received in an aligned state, it is difficult to precisely align the positions of the plurality of pouch-shaped battery cells in the stacking direction.

FIG. 2 is a perspective view showing the concept of a secondary battery dimension measurement apparatus according to Korean Patent Application Publication No. 2019-0051831.

Referring to FIG. 2, the secondary battery dimension measurement apparatus includes an ultraviolet irradiation unit 30 configured to irradiate a fluorescent reference mark 20 of a pouch-shaped battery cell 100 with ultraviolet light, the fluorescent reference mark 20 being formed at the center of the pouch-shaped battery cell, and a laser measurement unit 40, wherein the laser measurement unit 40 includes a laser irradiation portion 41, a light receiving portion 42, and a calculation portion 43.

The light receiving portion 42 receives the reflection of laser light irradiated on the pouch-shaped battery cell 100 and receives fluorescence of the fluorescent reference mark 20 that is fluoresced by ultraviolet light radiated by the ultraviolet irradiation unit 30, and the calculation portion 43 analyzes data of the light receiving portion 42 to calculate the dimensions of the pouch-shaped battery cell 100 based on the fluorescent reference mark 20.

Patent Document 1 suggests technology to calculate the overall width, overall length, and thickness of a single pouch-shaped battery cell, but does not suggest technology to minimize positional tolerance when a plurality of pouch-shaped battery cells is stacked and aligned.

Meanwhile, when a plurality of pouch-shaped battery cells is disposed in tight face-to-face contact and pressed, all electrodes must be uniformly pressed in order to prevent degradation in performance and safety of a battery module. However, if the pouch-shaped battery cells are pressed in the state in which pouch-shaped battery cells are not precisely aligned with each other, the electrodes of the misaligned pouch-shaped battery cells may have unpressed regions.

If contact between the electrodes is completely achieved, as described above, problems, such as increase in resistance and lithium precipitation, may occur, which may compromise the performance and safety of the pouch-shaped battery cells.

Therefore, there is a need for technology to easily and accurately align the positions of pouch-shaped battery cells, thereby preventing degradation in performance of the battery cells and improving safety of the battery cells.

DISCLOSURE

Technical Problem

The present invention has been made in view of the above problems, and it is an object of the present invention to provide a battery cell stack with alignment marks, by which a plurality of pouch-shaped battery cells is easily and accurately stacked and aligned with each other, a method of manufacturing the same, and an alignment mark forming apparatus for forming the alignment marks at the battery cell stack.

Technical Solution

In order to accomplish the above object, the present invention provides a battery cell stack in which a plurality of pouch-shaped battery cells is stacked, wherein an alignment mark is formed at the bottom of a receiving portion configured to receive an electrode assembly in each of the plurality of pouch-shaped battery cells, and the plurality of pouch-shaped battery cells is stacked such that the alignment marks individually formed at the pouch-shaped battery cells are coaxial in a stacking direction (e.g., completely overlie each other in a stacking direction).

The alignment mark may include a first alignment mark and a second alignment mark, and an imaginary connection line connecting the first alignment mark and the second alignment mark may be parallel to an overall length direction of the pouch-shaped battery cell.

The alignment mark may be at least one selected from the group consisting of an ink mark, a laser engraving, and a sticker.

In addition, the present invention provides a method of manufacturing the battery cell stack, the method including (a) placing a laminate sheet on a die, (b) pressing the laminate sheet using a punch to form a battery case, (c) forming an alignment mark at the bottom of the battery case, (d) receiving an electrode assembly in the battery case and sealing the battery case to manufacture a pouch-shaped battery cell, and (e) stacking the pouch-shaped battery cell such that the alignment mark of the pouch-shaped battery cell overlaps in a stacking direction, wherein step (c) is performed as a process of performing stamping, ink printing, laser beam irradiation, or sticker application at a constant position on the bottom of the battery case.

The step of forming the alignment mark may be performed in the state in which the laminate sheet is pressed using the punch.

The present invention provides an alignment mark forming apparatus for forming an alignment mark on the battery cell stack, the apparatus including a die provided with a recess configured to form a receiving portion that receives an electrode assembly, a punch located above the die, the punch being configured to press a laminate sheet, and a marking member configured to form an alignment mark at an outer surface of the bottom of the receiving portion in the laminate sheet.

The die may be provided with at least two openings formed through the bottom of the recess in a direction perpendicular thereto.

Each of the openings may be formed on a straight line passing through a center line of an overall width of the die and parallel to an overall length of the die.

The marking member may be inserted through each of the openings to form the alignment mark.

The marking member may be a stamping device, an ink printing device, a laser engraving device, or a sticker application device.

The openings may include a first opening and a second opening, the first opening may be formed at the center of the bottom of the recess of the die, and the second opening may be formed on a straight line passing through the first opening and parallel to an overall length of the recess.

In addition, the present invention may provide various combinations of the above constructions.

Advantageous Effects

As is apparent from the above description, a battery cell stack according to the present invention includes pouch-shaped battery cells each having an alignment mark formed at an outer surface thereof, and therefore it is possible to accurately and easily align the plurality of pouch-shaped battery cells in a stacking direction.

In addition, an alignment mark forming apparatus according to the present invention forms an alignment mark at a constant position on an outer surface of a pouch-shaped battery cell, wherein the alignment mark may be a reference for measuring the dimensions of the pouch-shaped battery cell.

Alignment of pouch-shaped battery cells in the stacking direction may be precisely performed based on the alignment mark formed at each of the pouch-shaped battery cells, whereby it is possible to reduce tolerance in positional alignment in the stacking direction when the battery cell stack is manufactured.

In addition, when the pouch-shaped battery cells are disposed in tight contact with each other, the pressed surfaces of the pouch-shaped battery cells may be equalized, whereby it is possible to prevent increase in resistance and to increase lifespan of the pouch-shaped battery cells.

DESCRIPTION OF DRAWINGS

FIG. 1 is a front view and a plan view of a general pouch-shaped battery cell.

FIG. 2 is a perspective view showing the concept of a secondary battery dimension measurement apparatus according to the prior art.

FIG. 3 is a plan view of a pouch-shaped battery cell with an alignment mark.

FIG. 4 is a side view of a battery cell stack in which pouch-shaped battery cells with alignment marks are stacked.

FIG. 5 is a view showing a battery cell stack manufacturing process using an alignment mark forming apparatus.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the drawings.

FIG. 3 is a plan view of a pouch-shaped battery cell with an alignment mark.

Referring to FIG. 3, a pouch-shaped battery cell 100 constituting a battery cell stack according to the present invention includes an electrode assembly and an electrolyte received in a pouch-shaped battery case made of a laminate sheet including a resin layer and a metal layer, the pouch-shaped battery case including a receiving portion 110 configured to receive the electrode assembly and a sealed portion 120 for sealing by thermal fusion, and an alignment mark 130 for alignment of the pouch-shaped battery cell is formed at an outer surface of the bottom of the receiving portion 110.

In a preferred example, the laminate sheet may be configured to have a laminated structure of an outer resin layer, an air and moisture barrier metal layer, and a thermally fusible inner resin layer.

Since the outer resin layer must have excellent resistance to the external environment, it is necessary to have tensile strength and weather resistance above a predetermined level. In this respect, a polymer resin constituting the outer resin layer may include at least one selected from the group consisting of polyethylene naphthalate (PEN), polyethylene terephthalate (PET), and stretched nylon.

The metal layer may be made of aluminum (Al) or an aluminum alloy so as to perform a function of improving the strength of the battery case in addition to a function of preventing the inflow of foreign matter, such as gas or moisture, and the outflow of an electrolytic solution.

The inner resin layer may be made of a polymeric resin that is thermally fusible, has low hygroscopicity to the electrolytic solution, and is not swollen or eroded by the electrolytic solution, and may be made of, for example, a cast polypropylene (CPP) film.

The alignment mark is a reference for positioning a plurality of pouch-shaped battery cells when the pouch-shaped battery cells are disposed such that the bottoms of the receiving portions of the pouch-shaped battery cells are in tight face-to-face contact in order to constitute a battery cell stack, and may be formed in an x shape, a + shape, a circular shape, an angular shape, or a combination thereof.

FIG. 3 illustrates an alignment mark in which a + shape and a circular shape are superimposed, wherein the intersection of horizontal and vertical axes of the + shape may be a reference for positioning when the pouch-shaped battery cells are stacked, or the entirety of the alignment mark may be a reference for positioning, whereby the pouch-shaped battery cells may be stacked such that all of the alignment marks are aligned with each other.

The alignment mark is not particularly limited in type as long as the alignment mark indicates a specific location on an outer surface of the pouch-shaped battery case, and may be, for example, at least one selected from the group consisting of an ink mark, a laser engraving, and a sticker.

The alignment mark 130 includes a first alignment mark 131 and a second alignment mark 132. A first imaginary connection line 112 connecting the first alignment mark 131 and the second alignment mark 132 is formed parallel to an overall length (L) direction of the pouch-shaped battery cell 100, and the first imaginary connection line 112 becomes a reference line of the overall length L. A second imaginary connection line 113, which is perpendicular to the first imaginary connection line 112, becomes a reference line of an overall width W of the pouch-shaped battery cell 100. The intersection of the first imaginary connection line 112 and the second imaginary connection line 113 may be a center point of the first alignment mark 131, and the first alignment mark 131 may be a reference origin for alignment when the pouch-shaped battery cells 100 are stacked.

In general, for an alignment mark forming apparatus, a die configured to form the receiving portion that receives the electrode assembly is precisely manufactured. When the alignment mark, which becomes a reference origin for alignment when the pouch-shaped battery cells are stacked, is formed at a specific location on the die, therefore, the alignment mark may be formed at constant positions on the pouch-shaped battery cells.

When the alignment mark is added to the pouch-shaped battery case or the pouch-shaped battery cell after the pouch-shaped battery case is formed, on the other hand, an error in the relative position and orientation of the die and the receiving portion that receives the electrode assembly is added, whereby a dimensional tolerance of the pouch-shaped battery cell becomes large. In order to reduce the dimensional tolerance of the pouch-shaped battery cell, therefore, it is preferable to form the alignment mark at the pouch-shaped battery cell in the state in which the pouch-shaped battery case is not removed from the alignment mark forming apparatus.

In a concrete example, a method of indicating the overall length and the overall width of the pouch-shaped battery cell as L and W, respectively, and indicating the overall length and the overall width of the die in the alignment mark forming apparatus as L' and W' (not shown), respectively, to form the first alignment mark 131 and the second alignment mark 132 may be described.

A first marking position for forming the first alignment mark 131 is set on a center line of the overall width W' of the die, and a second marking position for forming the second alignment mark 132 is set on an imaginary straight line passing through the first marking position and parallel to the overall length L' of the die. Alternatively, the first marking position and the second marking position may be set on a straight line passing through the center line of the overall width W' of the die and parallel to the overall length L' of the die.

When the first alignment mark and the second alignment mark are formed at the laminated sheet at the first marking position and the second marking position by alignment marking, the first imaginary connection line 112 connecting the first alignment mark and the second alignment mark may be formed substantially parallel to the overall length L' of the die when considering a positional error of a marking member of the alignment mark forming apparatus.

In terms of ease of uniform management in dimensions of the pouch-shaped battery cell, the intersection of a center line of the overall length L' of the die of the alignment mark forming apparatus and the center line of the overall width W' of the die may be set as the first marking position, and the second marking position may be set on a straight line passing through the first marking position parallel to the overall length L' of the die. That is, the first alignment mark may be set so as to be located at the center of the bottom of the electrode assembly receiving portion.

The greater the distance between the first alignment mark 131 and the second alignment mark 132, the less a rotational angle error between the overall length L of the first imaginary connection line 112 and the overall length L' of the die with respect to the reference origin, which is the first alignment mark 131.

When the alignment mark is formed, as described above, tolerance may be managed over the overall width W of the pouch-shaped battery cell or the overall length L of the pouch-shaped battery cell. In addition, when the reference origin, which is the first alignment mark 131, is marked at the center of the receiving portion, tolerance management may be performed over an individual half-length or half-width to an end in either direction along the first imaginary connection line 112 and the second imaginary connection line 113 having the first alignment mark 131 as the center thereof, whereby more precise tolerance management may be performed.

When the first alignment mark, which is the reference origin, is formed at the center of the receiving portion, the half-length or the half-width may be defined as the length from the reference origin to an end of the pouch-shaped battery cell extending along the first imaginary connection line 112 or the second imaginary connection line 113.

Alternatively, even though the first alignment mark 131 and the second alignment mark 132 are formed at any points of the receiving portion 110, the first alignment mark 131 and the second alignment mark 132 are formed at the same point for all of the pouch-shaped battery cells, and therefore when the plurality of pouch-shaped battery cells is stacked such that the first alignment marks 131 are aligned with each other and the second alignment marks 132 are aligned with each other, it is possible to obtain a battery cell stack with minimal positional alignment tolerance in a stacking direction.

In (a) of FIG. 3, the first alignment mark 131 and the second alignment mark 132 are formed such that the distance between the first alignment mark and the second alignment mark is equal to or greater than 50% of the overall length L of the pouch-shaped battery cell 100. In (b) of FIG. 3, the first alignment mark 131 is formed at a central part of the receiving portion 110 of the pouch-shaped battery cell 100.

When the first alignment mark 131 and the second alignment mark 132 are formed so as to be spaced apart from each other, as shown in (a) of FIG. 3, there is an advantage in that it is possible to reduce a rotation error of an overall-length axis connecting the first alignment mark and the second alignment mark When the first alignment mark 131 is formed at the central part of the receiving portion 110 of the pouch-shaped battery cell 100, as shown in (b) of FIG. 3, it is possible to manufacture a battery cell stack in which a plurality of pouch-shaped battery cells is easily and accurately aligned with each other by simply stacking the pouch-shaped battery cells such that the first alignment marks 131 and the second alignment marks 132 are located at constant positions.

FIG. 4 is a side view of a battery cell stack in which pouch-shaped battery cells with alignment marks are stacked.

Referring to FIG. 4, the battery cell stack 1000 is configured such that a plurality of pouch-shaped battery cells 100 is stacked, receiving portions 110 of the plurality of pouch-shaped battery cells 100 are disposed so as to face upwards, and a first alignment mark 131 and a second alignment mark 132 are formed at the bottom of the receiving portion 110, in which an electrode assembly is received, of each of the pouch-shaped battery cells 100.

The plurality of pouch-shaped battery cells is stacked such that the first alignment marks 131 and second alignment marks 132 formed at individual pouch-shaped battery cells are precisely aligned in a stacking direction S, whereby it is possible to reduce positional tolerance when the battery cell stack 1000 is received in a module housing or a battery pack case.

Although the plurality of pouch-shaped battery cells 100 is shown as being spaced apart from each other in FIG. 4, which is for convenience of description, the pouch-shaped battery cells 100 may be disposed in tight contact with each other such that the receiving portions 110 are precisely aligned with each other in the stacking direction.

Consequently, the entire areas of the receiving portions 110 of all of the pouch-shaped battery cells may be pressed with the same force, and therefore it is possible to prevent a decrease in lifespan of the battery cells or an increase in resistance of the battery cells due to uneven pressing.

A stacking method for forming a battery cell stack 1000 may include (a) a step of checking an alignment mark formed at a pouch-shaped battery cell 100, (b) a step of transferring the pouch-shaped battery cell to a stacking unit (not shown), and (c) a step of checking the positions of pouch-shaped battery cells stacked in the stacking unit and stacking the pouch-shaped battery cell on the pouch-shaped battery cells so as to be aligned therewith, wherein the step of checking the alignment mark may be performed as a process of checking the shape and position of the alignment mark using a vision sensor 200.

Step (a) may include determining whether the alignment mark is formed at an outer surface of the pouch-shaped battery cell, checking the position of the pouch-shaped battery cell at which the alignment mark is formed, and checking the shape and color of the alignment mark.

In step (b), the pouch-shaped battery cell may be transferred to the stacking unit using a transfer device driven by rotation of a transfer roll or using a robot equipped with a gripper.

Step (c) may include checking the position of a first alignment mark 131 and a second alignment mark 132 using vision sensors 200 located above the pouch-shaped battery cell and adjusting the position of the pouch-shaped battery cell such that the positions of first alignment marks 131 and the positions of second alignment marks 132 coincide with each other in a stacking direction S.

That is, in step (c), the pouch-shaped battery cells are not disposed such that the positions of outer peripheries of the pouch-shaped battery cells coincide with each other but are disposed such that the positions of the first alignment marks 131 and the second alignment marks 132 coincide with each other.

FIG. 5 is a view showing a battery cell stack manufacturing process using an alignment mark forming apparatus.

Referring to FIG. 5, a battery cell stack manufacturing method may include (a) a step of placing a laminate sheet 10 on a die 310, (b) a step of pressing the laminate sheet 10 using a punch 320 to form a battery case, (c) a step of forming an alignment mark at the bottom of the battery case, (d) a step of receiving an electrode assembly in the battery case and sealing the battery case to manufacture a pouch-shaped battery cell, and (e) a step of stacking the pouch-shaped battery cell such that the alignment mark of the pouch-shaped battery cell overlaps in the stacking direction, wherein step (c) may be performed as a process of performing stamping, ink printing, laser beam irradiation, or sticker application at a constant position on the bottom of the battery case.

The step of forming the alignment mark may be performed in the state in which the laminate sheet 10 is pressed using the punch 320, whereby it is possible to prevent movement or deformation of the laminate sheet 10 when a marking member 330 performs stamping, ink printing, laser beam irradiation, or sticker application at the laminate sheet 10.

Step (d) may include separating the battery case from the die 310, receiving an electrode assembly in the battery case, and sealing the battery case, or alternatively may include receiving the electrode assembly in the battery case and sealing the battery case in the state in which the battery case having the alignment mark formed thereat is not separated from the die to manufacture a pouch-shaped battery cell and separating the pouch-shaped battery cell from the die.

An alignment mark forming apparatus according to the present invention may include a die 310 provided with a recess 312 configured to form a receiving portion that receives an electrode assembly, a punch 320 located above the die 310, the punch being configured to press a laminate sheet 10, and a marking member 330 configured to form an alignment mark at an outer surface of the bottom of the receiving portion in the laminate sheet 10.

The die 310 is provided with at least two openings 311 formed through the bottom of the recess 312 in a direction perpendicular thereto. As a result, the marking member 330 is inserted through each of the openings 311 to form an alignment mark at an outer surface of the laminate sheet 10. The marking member 330 may be a stamping device, an ink printing device, a laser engraving device, or a sticker application device.

Each opening 311 may be formed on a straight line passing through a center line of an overall width of the die 310 and parallel to an overall length of the die 310.

The openings 311 may include a first opening and a second opening, wherein the first opening may be formed at the center of the bottom of the recess 312 of the die 310 and the second opening may be formed on a straight line passing through the first opening and parallel to the overall length of the recess 312.

When pouch-shaped battery cells are manufactured using the alignment mark forming apparatus configured as described above, alignment marks may be formed at constant positions on outer surfaces of all of the pouch-shaped battery cells, and when the pouch-shaped battery cells are stacked based on the alignment marks, positional tolerance may be minimized and a reference for measuring the dimensions of the pouch-shaped battery cells may be secured.

Those skilled in the art to which the present invention pertains will appreciate that various applications and modifications are possible within the category of the present invention based on the above description.

DESCRIPTION OF REFERENCE SYMBOLS

10: Laminate sheet
20: Fluorescent reference mark
30: Ultraviolet irradiation unit
40: Laser measurement unit
41: Laser irradiation portion
42: Light receiving portion
43: Calculation portion
100: Pouch-shaped battery cell
110: Receiving portion
111: Side surface of receiving portion
112: First imaginary connection line
113: Second imaginary connection line
120: Sealed portion
130: Alignment mark
131: First alignment mark
132: Second alignment mark
200: Vision sensor
310: Die
311: Opening
312: Recess
320: Punch
330: Marking member
1000: Battery cell stack
L: Overall length of pouch-shaped battery cell
R: Gradient angle
S: Stacking direction
W: Overall width of pouch-shaped battery cell

The invention claimed is:

1. A battery cell stack in which a plurality of pouch-shaped battery cells is stacked,
- each of the pouch-shaped battery cells includes at least one alignment mark formed at a bottom of a receiving portion configured to receive an electrode assembly wherein
- the plurality of pouch-shaped battery cells is stacked such that the at least one alignment marks individually formed at the pouch-shaped battery cells are coaxial in a stacking direction.

2. The battery cell stack according to claim 1, wherein
- the at least one alignment mark comprises a first alignment mark and a second alignment mark, and
- an imaginary connection line connecting the first alignment mark and the second alignment mark is parallel to an overall length direction of the pouch-shaped battery cell.

3. The battery cell stack according to claim 1, wherein the at least one alignment mark is at least one of an ink mark, a laser engraving, or a sticker.

4. A method of manufacturing the battery cell stack according to claim 1, the method comprising:
- (a) placing a laminate sheet on a die;
- (b) pressing the laminate sheet using a punch to form a battery case;

(c) forming the at least one alignment mark at a bottom of the battery case;

(d) receiving the electrode assembly in the battery case and sealing the battery case to manufacture the pouch-shaped battery cell; and (e) stacking the pouch-shaped battery cell such that the at least one alignment mark of the pouch-shaped battery cell is coaxial with the at least one alignment mark of another pouch-shaped battery cell in a stacking direction, wherein step (c) is performed as a process of performing stamping, ink printing, laser beam irradiation, or sticker application at a constant position on the bottom of the battery case.

5. The method according to claim 4, wherein the step of forming the at least one alignment mark is performed in a state in which the laminate sheet is pressed using the punch.

6. An alignment mark forming apparatus for forming the at least one alignment mark on the battery cell stack according to claim 1, the apparatus comprising:

a die provided with a recess configured to form the receiving portion that receives the electrode assembly;

a punch located above the die, the punch being configured to press a laminate sheet; and a marking member configured to form the at least one alignment mark at an outer surface of the bottom of the receiving portion at the laminate sheet.

7. The alignment mark forming apparatus according to claim 6, wherein the die is provided with at least two openings formed through a bottom of the recess in a direction perpendicular thereto.

8. The alignment mark forming apparatus according to claim 7, wherein each of the openings is formed on a straight line passing through a center line of an overall width of the die and parallel to an overall length of the die.

9. The alignment mark forming apparatus according to claim 7, wherein the marking member is inserted through each of the openings to form the at least one alignment mark.

10. The alignment mark forming apparatus according to claim 6, wherein the marking member is a stamping device, an ink printing device, a laser engraving device, or a sticker application device.

11. The alignment mark forming apparatus according to claim 7, wherein the at least two openings comprise a first opening and a second opening, the first opening is formed at a center of the bottom of the recess of the die, and the second opening is formed on a straight line passing through the first opening and parallel to an overall length of the recess.

* * * * *